United States Patent
Padberg et al.

(10) Patent No.: US 10,661,997 B2
(45) Date of Patent: May 26, 2020

(54) ROLLER, ROLLER DEVICE, LINK CHAIN, AND USE OF A LINK CHAIN AS A CONVEYING CHAIN

(71) Applicant: Ketten-Wulf Betriebs-GmbH, Eslohe-Kückelheim (DE)

(72) Inventors: Frank Padberg, Schmallenberg (DE); Christian Hanemann, Meschede (DE)

(73) Assignee: KettenWulf Betriebs GmbH, Eslohe-Kückelheim (DE)

( * ) Notice: Subject to any disclaimer, the term of this patent is extended or adjusted under 35 U.S.C. 154(b) by 0 days.

(21) Appl. No.: 16/010,129

(22) Filed: Jun. 15, 2018

(65) Prior Publication Data
US 2018/0290836 A1    Oct. 11, 2018

Related U.S. Application Data

(63) Continuation of application No. PCT/EP2016/081543, filed on Dec. 16, 2016.

(30) Foreign Application Priority Data

Dec. 18, 2015  (DE) .................. 10 2015 122 207

(51) Int. Cl.
*B65G 39/20* (2006.01)
*F16G 13/06* (2006.01)
(Continued)

(52) U.S. Cl.
CPC ............ *B65G 39/20* (2013.01); *F16C 13/006* (2013.01); *F16C 13/022* (2013.01); *F16C 19/06* (2013.01);
(Continued)

(58) Field of Classification Search
CPC ...... B65G 39/20; F16C 13/006; F16C 13/022; F16C 19/54; F16C 19/541; F16G 13/06
(Continued)

(56) References Cited

U.S. PATENT DOCUMENTS 1,967,496 A * 7/1934 Carr .................... F16G 13/06
                                                    198/851
2,138,317 A * 11/1938 Weiss ................... F27B 9/243
                                                    198/851
(Continued)

FOREIGN PATENT DOCUMENTS

CN          2214580 Y      12/1995
CN       201021741 Y       2/2008
(Continued)

OTHER PUBLICATIONS

US 2009/0188778 A1, Fujiwara, Jul. 30, 2009.*
(Continued)

*Primary Examiner* — Douglas A Hess
(74) *Attorney, Agent, or Firm* — Edell, Shapiro & Finnan, LLC

(57) ABSTRACT

A roller device comprises: an attachment bolt; a roller mounted on the attachment bolt, wherein the roller is configured as a roller unit including at least one attachment bush, a bearing, and a roller; and a fastening system to releasably fasten the bush of the roller unit to the attachment bolt. The fastening system comprises a clip fastening system to mount the roller unit on the attachment bolt without using tools. The clip fastening system comprises a radially encircling groove in the inner surface of the attachment bush, a radially encircling groove in the surface of the attachment bolt, and a flexible securing ring.

13 Claims, 7 Drawing Sheets

(51) Int. Cl.
 F16C 19/54 (2006.01)
 F16C 13/00 (2006.01)
 F16C 13/02 (2006.01)
 F16C 19/06 (2006.01)

(52) U.S. Cl.
 CPC ............ *F16C 19/54* (2013.01); *F16C 19/541* (2013.01); *F16G 13/06* (2013.01)

(58) Field of Classification Search
 USPC ....................................................... 198/851
 See application file for complete search history.

(56) References Cited

U.S. PATENT DOCUMENTS

| 3,015,527 | A | * | 1/1962 | Schmidt | ................ | B65G 39/20 |
| | | | | | | 184/15.1 |
| 3,406,438 | A | * | 10/1968 | Reilly | ................... | B65G 39/02 |
| | | | | | | 198/842 |
| 3,803,682 | A | * | 4/1974 | Stein | .................... | B65G 13/073 |
| | | | | | | 198/791 |
| 4,852,230 | A | * | 8/1989 | Yu | .......................... | B65G 39/09 |
| | | | | | | 29/898.07 |
| 5,461,851 | A | * | 10/1995 | Lehrieder | ............... | B41F 13/03 |
| | | | | | | 198/851 |
| 5,759,125 | A | * | 6/1998 | Berg | ..................... | F16H 7/1218 |
| | | | | | | 474/112 |
| 6,004,036 | A | * | 12/1999 | Kloeppel | ................ | F16C 17/10 |
| | | | | | | 384/107 |
| 6,250,457 | B1 | * | 6/2001 | Spurck | ................... | B65G 39/20 |
| | | | | | | 198/817 |
| 6,702,350 | B1 | | 3/2004 | Gorniak | | |
| 7,354,191 | B2 | * | 4/2008 | Swisher | ................ | B28C 5/0818 |
| | | | | | | 277/562 |
| 7,594,572 | B2 | * | 9/2009 | Vogl | ....................... | B65G 13/07 |
| | | | | | | 198/781.07 |
| 7,967,305 | B2 | * | 6/2011 | Bergmeier | .......... | B66F 9/07518 |
| | | | | | | 280/124.1 |
| 8,425,119 | B2 | * | 4/2013 | Hunter | ................. | F16C 32/0622 |
| | | | | | | 384/109 |
| 9,896,274 | B2 | * | 2/2018 | Jager | ...................... | B65G 39/02 |

FOREIGN PATENT DOCUMENTS

| CN | 103523460 A | 1/2014 |
| CN | 204083166 U | 1/2015 |
| CN | 204269939 U | 4/2015 |
| DE | 3003564 A1 | 8/1981 |
| DE | 4420669 A1 | 1/1995 |
| DE | 19615416 C1 | 10/1997 |
| DE | 102006030212 A1 | 1/2008 |
| DE | 102006057461 A1 | 6/2008 |
| DE | 102007053185 A1 | 5/2009 |
| DE | 102008011613 A1 | 9/2009 |
| DE | 202008011613 U1 | 3/2010 |
| EP | 1834906 A2 | 9/2007 |
| KR | 20-0445609 Y1 | 8/2009 |
| KR | 10-2014-0007056 A | 1/2014 |

OTHER PUBLICATIONS

Int'l Search Report in corresponding PCT Application No. PCT/EP/081543, dated Jul. 12, 2017, with English translation.
Office Action in corresponding Chinese Patent Application No. 201680073745.8, dated Dec. 2, 2019, with English translation.

* cited by examiner

ROLLER, ROLLER DEVICE, LINK CHAIN, AND USE OF A LINK CHAIN AS A CONVEYING CHAIN

CROSS REFERENCE TO RELATED APPLICATIONS

This application is a continuation of International Application No. PCT/EP2016/081543, filed on Dec. 16, 2016, which claims priority under 35 U.S.C. § 119 to Application No. DE 102015122207.8 filed on Dec. 18, 2015, the entire contents of which are hereby incorporated by reference.

TECHNICAL FIELD

The present invention relates to a roller, a roller device, a link chain, and a method of using a link chain.

BACKGROUND

A roller of the type in question is well known. It is used, for example, in connection with link chains, when the latter are employed as conveying chains.

A link chain comprises a number of chain links, in particular inner links and outer links, which are connected to one another in an articulated manner, i.e., by a chain joint. These joints allow the link chain, for example, to wrap around the chain wheels located in the drive train.

The inner links are preferably formed of two inner link plates which are connected to each other by two bushes. An inner link plate in the form of a bar link plate is also conceivable. The outer links are preferably formed of two outer link plates, which are connected to each other by two bolts. In the adjacent chain links, a bolt is in each case received in an articulated manner in the bush. Bolt and bush form the chain link. This arrangement can be repeated as desired, such that a link chain of any desired length can be produced. The number of link plates per chain link is also variable, such that it is of course also possible for more than two link plates to be provided per chain link.

In addition to numerous other applications, link chains lend themselves to be used as a conveying chain. For this purpose, rollers are in most cases mounted on extended bolts or bushes of the link chain. An arrangement on the link plates or on other components of the link chain is also conceivable. The main purpose of the rollers is that the link chain can run on a guide rail via which loads of the article to be conveyed can be carried away. The rollers also have the effect that the tensile force of the chain is reduced, since the tensile force is reduced as a result of less friction or rolling friction. Provision can also preferably be made that at least some link plates are designed to be connected to add-on parts, for example platforms. For this purpose, some chain links are equipped, for example, with an attachment mechanism for add-on parts. The attachment mechanism can be designed, for example, in the form of angled link plates which, alongside the actual link plate, have an extension arm, to which the add-on parts can be connected. This results, in cross section, in a for example L-shaped link plate.

During the conveying of various articles and raw materials, the link chains used as conveying chains are exposed to the action of the articles themselves and also to the influences of the environment and surroundings. It is possible here for dirt and other substances and liquids to penetrate into parts of the link chain, in particular the rollers, and contribute there to more rapid and increased wear.

In the field of conveyor technology on link chains, the state of the art is for rollers to be mounted on extended bolts or bushes or on other shaft elements fastened to the link chains. Such a combination of link chain and roller has been disclosed in DE 10 2006 057461 A1, for example.

If the rollers fail or reach their wear limit, it may be necessary to replace them. Since the roller and its bearing are arranged directly on the extended bolt or on a shaft element, the dismantling of the roller involves considerable effort. In such an eventuality, several component parts have to be dismantled individually in succession, including component parts that have been joined together by an interference fit. However, assembly is also laborious.

SUMMARY

An object of the invention is to provide an improved roller, in particular a roller which is easier to assemble and/or disassemble.

According to the invention, a roller is configured as a roller unit, comprising at least one attachment bush, a bearing and a roller, where the aforementioned unit can be assembled and disassembled in one piece. For example, the bearing does not have to be disassembled as an individual part, and instead it can be removed from the attachment bolt together with the roller and the attachment bush. In other words, according to the invention, the roller including the bearing, and preferably a seal, is mounted on the attachment bush. Through the use of this attachment bush, which can be plugged onto the attachment bolt or onto a shaft element, it is possible to reduce the effort involved in assembly and disassembly. In this case, the roller and all the component parts needed for bearing and preferably sealing the roller are mounted on the attachment bush. This structural assembly is then designated as a roller unit.

Further advantageous embodiments of the proposed invention can be gathered in particular from the features of the dependent claims. The subjects or features of the various claims can in principle be combined with one another in any desired way.

In an advantageous embodiment of the invention, provision can be made that the attachment bush, the bearing and the roller are connected to one another releasably, wherein the roller is mounted rotatably about the attachment bush via the bearing.

In a further advantageous embodiment of the invention, provision can be made that the bearing is fixed axially and releasably between the roller and the attachment bush, wherein the releasable axial fixing comprises in particular a shoulder in the interior of the roller and a corresponding shoulder on the outer face of the attachment bush, and also at least one securing ring which is inserted into a groove in the roller and/or the attachment bush.

In a further advantageous embodiment of the invention, provision can be made that the roller is equipped with a lubricant-accommodating arrangement. The lubricant-accommodating arrangement allows the compact roller unit to be made available pre-filled with lubricant, i.e., the lubricant does not have to be introduced on the spot, for example in the contaminated environment of a conveying chain, and is instead already present in the roller unit.

In a further advantageous embodiment of the invention, provision can be made that the lubricant-accommodating arrangement comprises a lubricant-accommodating space. The lubricant-accommodating space is substantially provided by the gap between roller and attachment bush. It serves as a reservoir for the lubricant.

In a further advantageous embodiment of the invention, provision can be made that the lubricant-accommodating arrangement comprises at least one sealing arrangement, in particular at least one slide ring seal. The sealing arrangement can seal off the lubricant-accommodating space. A slide ring seal and a combination of a slide ring seal with a further contacting or contact-free seal have proven reliable in applications where there is considerable contamination. The slide ring seal is highly suitable for sealing off the lubricant-accommodating space, particularly upon relative movement of the slide rings, but is very sensitive to fouling during assembly. By pre-assembling the complete roller unit, assembly can be carried out at a clean site. Contamination with dirt is thus reduced to a minimum.

In a further advantageous embodiment of the invention, provision can be made that the lubricant-accommodating arrangement comprises a roller cover connected releasably to the roller and/or an attachment bush cover connected releasably to the attachment bush. The lubricant-accommodating space is ultimately made available by the gap between roller and attachment bush and is closed by the abovementioned components, in particular with the hollow cylindrical roller being closed by the roller cover and the hollow-cylindrical attachment bush being closed by the bush cover. In particular, the roller cover and the attachment bush cover can be removed afterward in order to gain access to the lubricant-accommodating space. On the one hand, the lubricant-accommodating space can thus be made accessible, for example in order to top up or replace lubricant. On the other hand, components such as the end face of the attachment bolt can be made accessible and the clip connector can be released.

A further object of the present invention is to make available a roller device comprising an attachment bolt and a roller mounted on the attachment bolt, which roller device is easy to assemble and/or disassemble. The fields of application of the roller device are numerous. The attachment bolt can in fact be mounted on many different components, for example on link plates of link chains, on add-on parts such as platforms of conveyor belts, or quite generally wherever rollers are needed.

In a further advantageous embodiment of the invention, provision can be made that the roller device is equipped with an anti-rotation mechanism between the attachment bush and the attachment bolt, wherein the anti-rotation mechanism comprises in particular a protuberance in the interior of the attachment bush and a corresponding recess in the attachment bolt. The anti-rotation mechanism secures the attachment bush against turning. This ultimately ensures that the rotation of the roller is effected via the bearing and that there is no rotation of the attachment bush on the attachment bolt.

In a further advantageous embodiment of the invention, provision can be made that the roller device is equipped with an abutment mechanism for limiting the axial displaceability of the attachment bush with respect to the attachment bolt, wherein the abutment mechanism comprises in particular a shoulder on the attachment bolt and a corresponding shoulder on the attachment bush. The above measure ensures that the attachment bush can be pushed onto the attachment bolt only by a predetermined length.

In a further advantageous embodiment of the invention, provision can be made that the roller device is equipped with a fastening system for the fastening, preferably the releasable fastening, in particular the releasable axial fixing, of the roller unit, in particular of the attachment bush, to the attachment bolt.

In an advantageous embodiment of the invention, provision can be made that such a fastening system comprises, for example, a circumferential groove in the attachment bolt and a corresponding securing ring which can be inserted into the groove. The securing ring then sits in front of the attachment bush and prevents a corresponding axial displacement of the attachment bush and therefore of the roller unit on the attachment bolt. This variant is simple and robust.

In a further advantageous embodiment of the invention, provision can be made that the fastening system comprises a securing pin which is inserted through aligned bores in attachment bush and attachment bolt. This fastening system can be arranged outside the lubricant-accommodating space and is to this extent particularly expedient in terms of assembly and disassembly.

In a further advantageous embodiment of the invention, provision can be made that the fastening system is configured as a clip fastening system for mounting the roller unit on the attachment bolt, preferably without using tools, wherein the clip fastening system comprises in particular a groove, in particular a radially encircling groove, in the inner surface of the attachment bush, and also a groove, in particular a radially encircling groove, in the surface of the attachment bolt, and also a flexible securing ring. When the roller unit is pushed onto the attachment bolt, the securing ring initially retreats until the grooves are flush, in order then to be received in both grooves and to counteract a pulling-off of the roller unit. This mounting procedure can be carried out easily and in particular without using tools.

In a further advantageous embodiment of the invention, provision can be made that the clip fastening system is equipped with a release mechanism, wherein in particular the groove in the attachment bolt is formed by the attachment bolt itself and by a plate screwed on in front of the end face of the attachment bolt. In this way, a releasable clip fastening system is made available which is of a simple and robust configuration and which can in addition be easily released on the spot. After removal of the roller cover and of the attachment bush cover, the plate can be unscrewed right away, as a result of which the groove is opened on one side and the roller unit can be pulled off from the attachment bolt. Correspondingly, the attachment bush can then also be removed from the attachment bolt, hence the entire roller element can be removed from the attachment bolt. The mounting procedure takes place in the usual way with the plate first of all being screwed back on again and the roller unit being pushed on. The roller unit can be replaced or, for example, can be refilled with lubricant, and the roller cover can then be closed again. The roller unit can be secured again by simply plugging it onto the attachment bolt.

A further object of the present invention is to make available a link chain with a roller device in which the roller is easier to assemble and/or disassemble. In an advantageous embodiment of the invention, provision can be made that the link chain comprises at least two chain links, in particular an inner link and an outer link, wherein the inner link is configured as a bar link plate with two bushes or comprises at least two inner link plates which are connected to each other by two bushes, wherein the outer link comprises at least two outer link plates which are connected to each other by two bolts, wherein in each case a bush and a bolt inserted into the bush of adjacent chain links form a chain joint, wherein the attachment bolt is configured as an extension of the bolt protruding from the outer link plate, wherein the roller unit is plugged onto the attachment bolt. In this connection, it is recommended that the bolt that is present anyway is extended and accordingly guided as an attachment bolt out of the link chain. The attachment bolt serves mainly to connect the roller unit to the link chain and preferably protrudes perpendicularly from the outer link plate. The extension of the bolt can accordingly be used as an attachment bolt.

A preferred use of the aforementioned link chain is a so-called conveying chain. In addition to having the rollers, the link chain can for this purpose also be equipped with attachment mechanism for the arrangement of add-on parts, for example platforms. A conveying chain according to the invention mainly comprises a link chain according to the invention and also at least one roller or roller unit or roller device according to the invention, and in particular at least one attachment mechanism for add-on parts, for example platforms.

BRIEF DESCRIPTION OF THE DRAWINGS

Further features and advantages of the present invention will become clear by way of the following description of preferred exemplary embodiments, with reference to the accompanying figures, in which.

DETAILED DESCRIPTION

Figure 1:
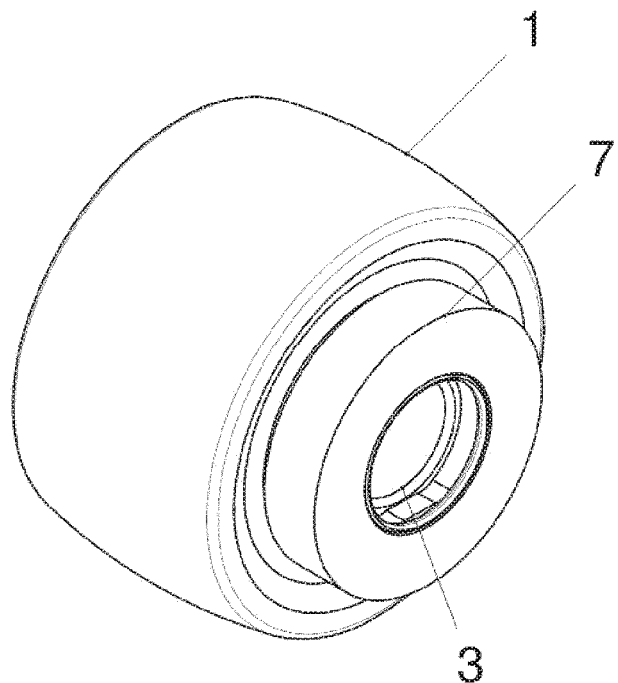
FIG. 1 shows a perspective view of a roller configured according to the invention as a roller unit.
Figure 2:
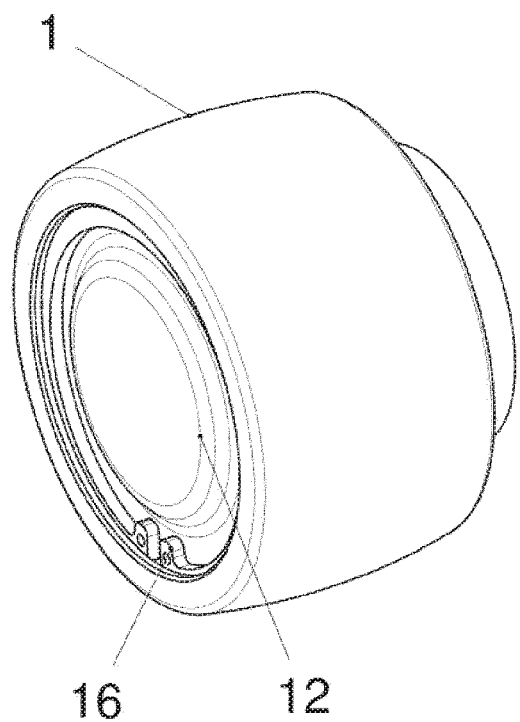
FIG. 2 shows another perspective view of a roller configured according to the invention as a roller unit.
Figure 3:
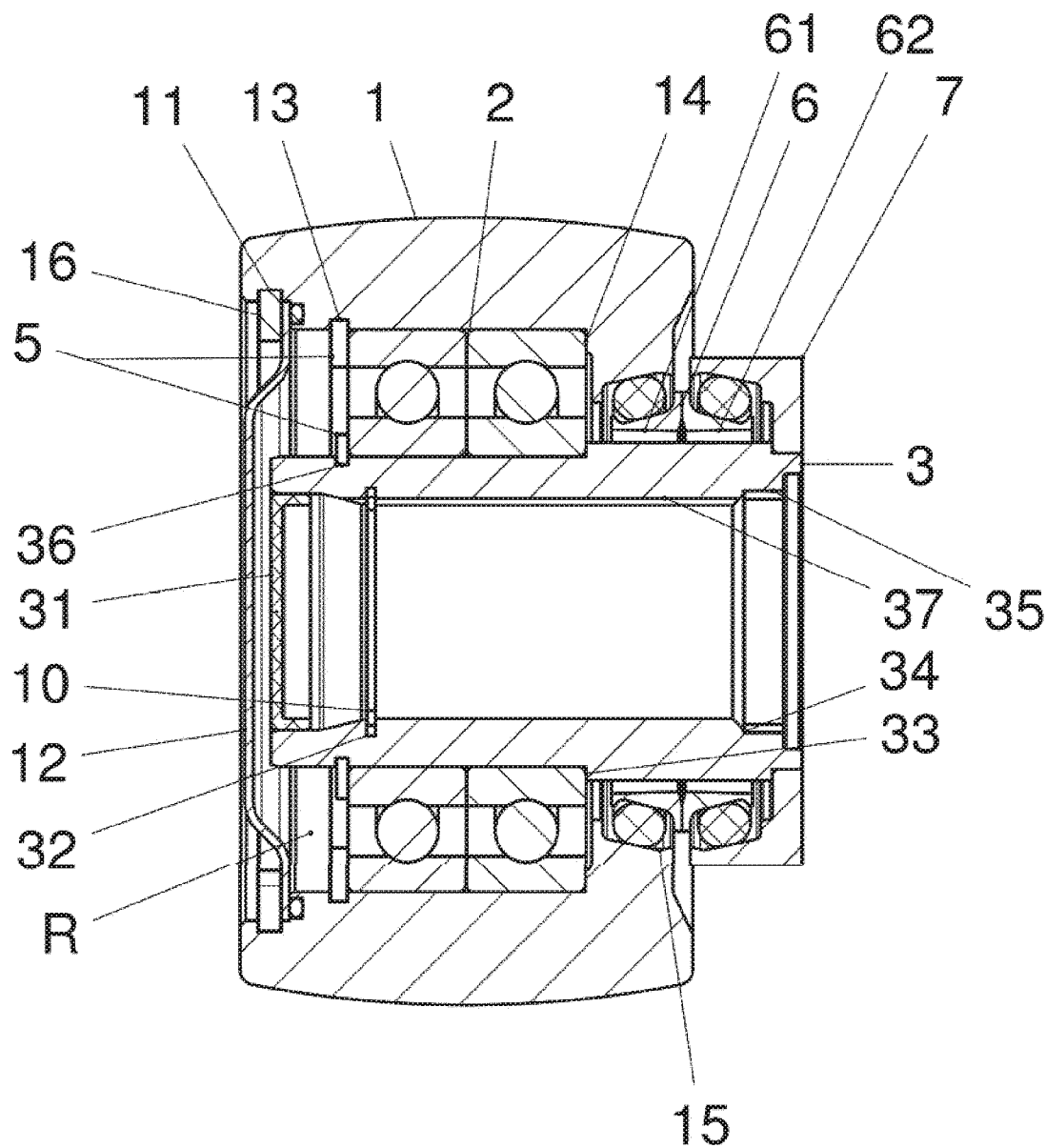
FIG. 3 shows a sectional view of a roller configured according to the invention as a roller unit.
Figure 4:
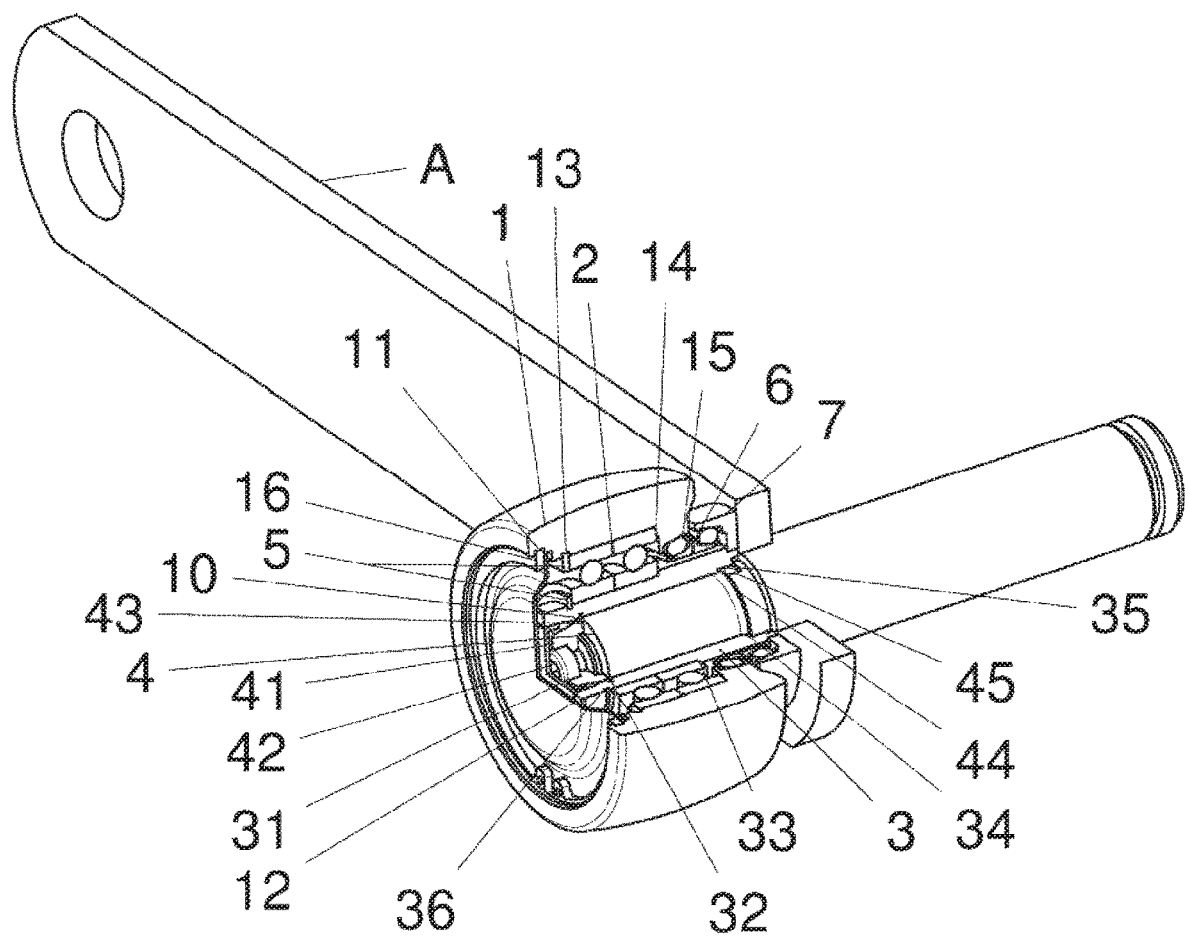
FIG. 4 shows a perspective and partially sectional view of a roller device according to the invention (with the outer link plate of a link chain)
Figure 5:
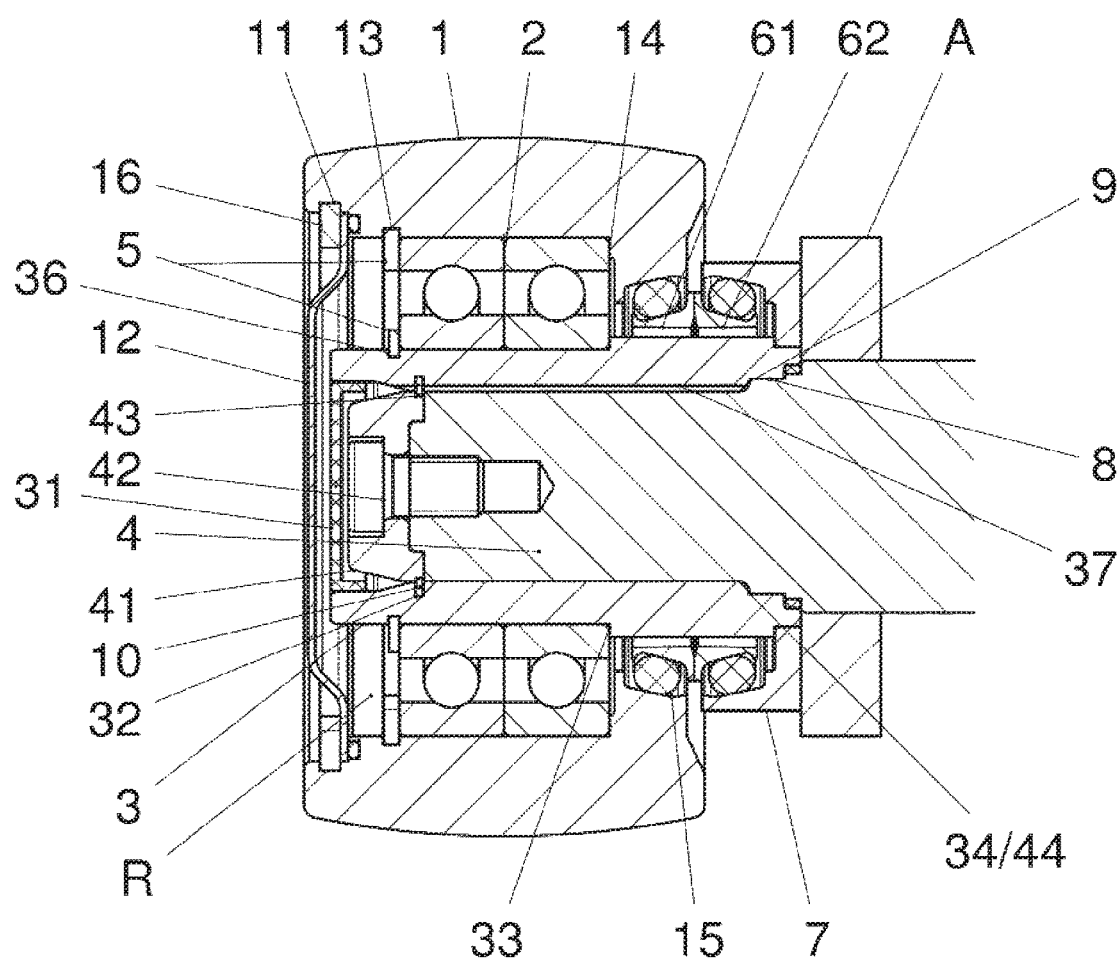
FIG. 5 shows a sectional view of a roller device according to the invention (with the outer link plate of a link chain)
Figure 6:
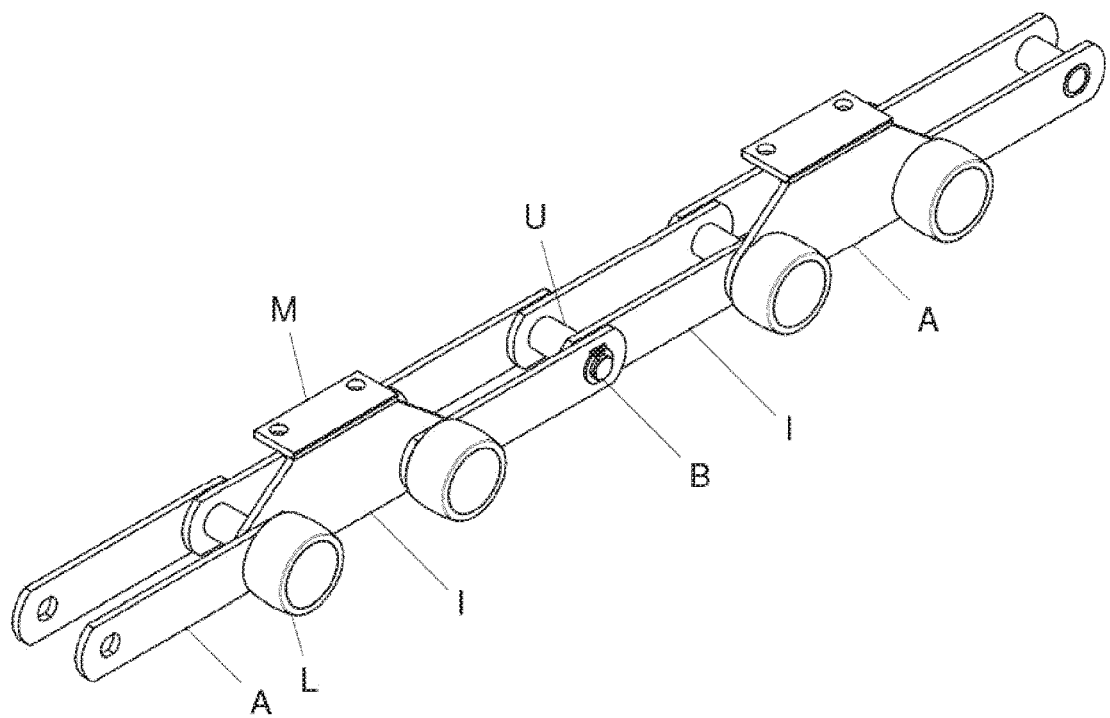
FIG. 6 shows a perspective view of a link chain according to the invention configured as a conveying chain.
Figure 7:
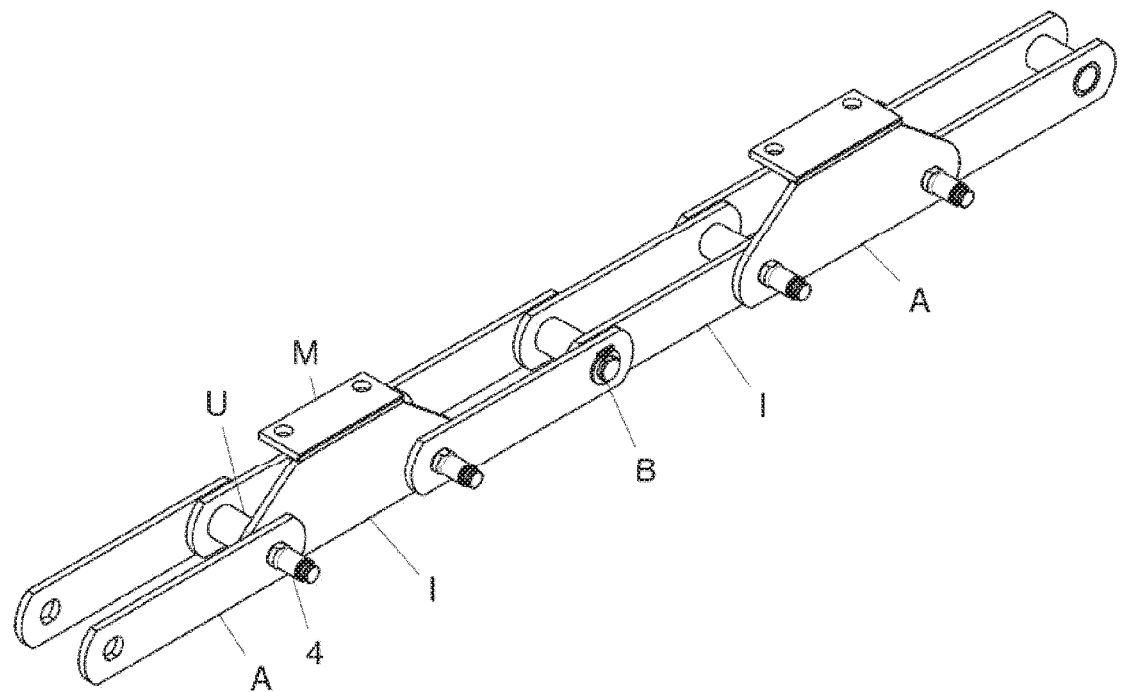
FIG. 7 shows a perspective view of a link chain according to the invention configured as a conveying chain, without plugged-on roller units.

Referring to FIGS. 1-7, a roller according to the invention is configured as a roller unit L, comprising mainly an attachment bush 3, a bearing 2, in particular a rotary bearing, and a roller 1. The attachment bush 3, the bearing 2 and the roller 1 are connected to one another releasably, wherein the roller 1 is mounted rotatably about the attachment bush 3 via the bearing 2.

The attachment bush 3 has substantially a hollow cylindrical shape and accordingly has an outer surface and an interior with an inner surface. The attachment bush 3 has for the most part a circular cylindrical cross section. Preferred materials for the attachment bush are metal, in particular steel, but also other materials such as high-strength plastics, non-ferrous metals, etc. The attachment bush 3 can be equipped with a groove 37 in the longitudinal direction on its inner side, which groove 37 can serve for release of air when the attachment bush 3 is mounted on an attachment bolt 4.

The roller 1 is preferably a conventional roller, for example made of metal, in particular steel, plastic, non-ferrous metal or another suitable material. The roller 1 is configured substantially as a hollow cylindrical body.

The bearing 2, in particular the rotary bearing, arranged between the roller 1 and the attachment bush 3 is preferably a roller bearing, in particular a ball bearing. However, other types of bearing are also conceivable. The bearing 2 is preferably fixed axially and releasably between the roller 1 and the attachment bush 3. For this purpose, for example, the roller 1 can have a suitable shoulder 14 in its interior, and the attachment bush 3 can likewise have a suitable shoulder 33 on its outer face. The bearing 2 is then pushed in between roller 1 and attachment bush 3 until it bears on both shoulders 14, 33. The pushed-in bearing 2 can in turn be secured by at least one securing ring 5, which is inserted into a groove 13 in the roller 1 and/or into a groove 36 of the attachment bush 3. To inspect the bearing 2, the securing rings 5 can also be removed again. Releasable form-fit connections are preferably used here. However, other connection mechanisms are also conceivable, for example force-fit connections.

The roller unit L constitutes a compact unit which can preferably be plugged in one piece with the attachment bush 3 onto a suitable attachment bolt 4 and can preferably also be removed in one piece from the attachment bolt 4.

Moreover the roller unit L can be equipped with a lubricant-accommodating arrangement which preferably permits filling even before the roller unit is mounted on an attachment bolt 4.

The lubricant-accommodating arrangement can comprise mainly a lubricant-accommodating space R, and also a sealing arrangement, a roller cover 12 connected releasably to the roller and/or an attachment bush cover 31 connected releasably to the attachment bush 3.

The sealing arrangement can comprise a slide ring seal 6 or a combination of this slide ring seal with a further contacting (or contact-free) seal. Moreover, the sealing arrangement can comprise a housing 7. A slide ring seal 6 generally comprises a first sealing ring 61 and a second sealing ring 62. The first sealing ring is preferably received between the roller 1 and the attachment bush 3. For this purpose, for example, an annular cutout 15 can be provided in the roller 1. The second sealing ring 62 can be received, for example, in the housing 7, which is formed for example by a ring of L-shaped cross section and by a portion of the attachment bush 3. The ring can, for example, be screwed onto, pressed onto or otherwise fastened to the attachment bush 3. The housing 7 can also be formed in one piece from the attachment bush 3. Provision is preferably made that the sealing arrangement, in particular the slide ring seal 6, is mounted, preferably directly, on the attachment bush 3. The sealing arrangement, in particular the slide ring seal 6, therefore no longer has to be arranged directly on an attachment bolt 4, and instead it can be arranged on the attachment bush 3. The sealing arrangement helps to close the lubricant-accommodating space R, in particular the hollow cylindrical roller 1.

The roller cover 12 is preferably arranged on the other side of the roller 1, i.e., on the side of the roller unit L opposite the sealing arrangement. The roller cover 12 is preferably fastened releasably to the roller 1, or to a groove 11 in the roller 1, by a securing ring 16. In addition to this form-fit connection, alternative methods of releasable connection are likewise conceivable. The roller cover 12 helps to close the lubricant-accommodating space R, in particular the hollow cylindrical roller 1.

The attachment bush cover 31 is arranged in the attachment bush 3 at the end face, directly behind the roller cover 12. The attachment bush cover 31 can be connected releasably to the attachment bush 3 by an interference fit or in another suitable way. The attachment bush cover 31 helps to close the lubricant-accommodating space R, in particular with respect to the hollow cylindrical attachment bush 3.

Between the roller 1 and the attachment bush 3, and also between the roller cover 12, the attachment bush cover 31 and the sealing arrangement, in particular the first sealing ring 61, there is a gap which is filled, preferably not completely, by the bearing 2. This remainder of the gap preferably forms the lubricant-accommodating space R.

The lubricant-accommodating space R is filled with a lubricant, for example oil or grease, which is able to ensure the lubrication of the bearing 2. The lubricant can be introduced into the lubricant-accommodating space R before the roller unit L is mounted in place, i.e., the lubricant does not have to be introduced on the spot, for example in the contaminated environment of a conveying chain. This circumstance is beneficial particularly in the case of a sealing arrangement configured as a slide ring seal, since the latter, while providing a very good seal, is nonetheless generally very susceptible to fouling.

A roller device according to the invention comprises mainly a roller unit L according to the invention and an attachment bolt 4 suitable for plugging on the attachment bush 3 or an attachment bolt 4 inserted into the attachment bush. Moreover, the roller device can be equipped with an anti-rotation mechanism 8, an abutment mechanism 9 and/or a fastening system, in particular a clip fastening system.

The attachment bolt 4 is preferably a bolt or pin, for example an extended bolt B which protrudes from a link chain of a chain link, and on which the attachment bush 3 and thus the roller unit L as a whole can be plugged. However, other attachment bolts are also conceivable, for example bolts which are mounted on add-on parts such as the platforms of conveyor belts. A roller mounted in this way would be, for example, part of a central guide of a conveyor belt. To this extent, the interior of the attachment bush corresponds substantially to the outer contour of the attachment bolt in order to permit the plugging or fixing of the roller unit L on the attachment bolt 4.

In order to ensure that the roller unit can be pushed axially onto the attachment bolt only by a predetermined extent, the roller device is preferably equipped with the abutment mechanism 9. The abutment mechanism can, for example, comprise a shoulder 44 in the attachment bolt 4 and a corresponding shoulder 34 in the attachment bush 3.

In order to ensure that the attachment bush of the roller unit is received on the attachment bolt in a manner secure against rotation, the anti-rotation mechanism 8 is preferably provided. The anti-rotation mechanism can be formed, for example, by a protuberance 35 in the cross section of the interior of the attachment bush 3 and by a corresponding recess 45 in the attachment bolt 4. The form-fit anti-rotation mechanism 8 described here can also be configured for force-fit engagement or in another suitable way.

The abutment mechanism and the anti-rotation mechanism can be combined in one device.

Figure 8:
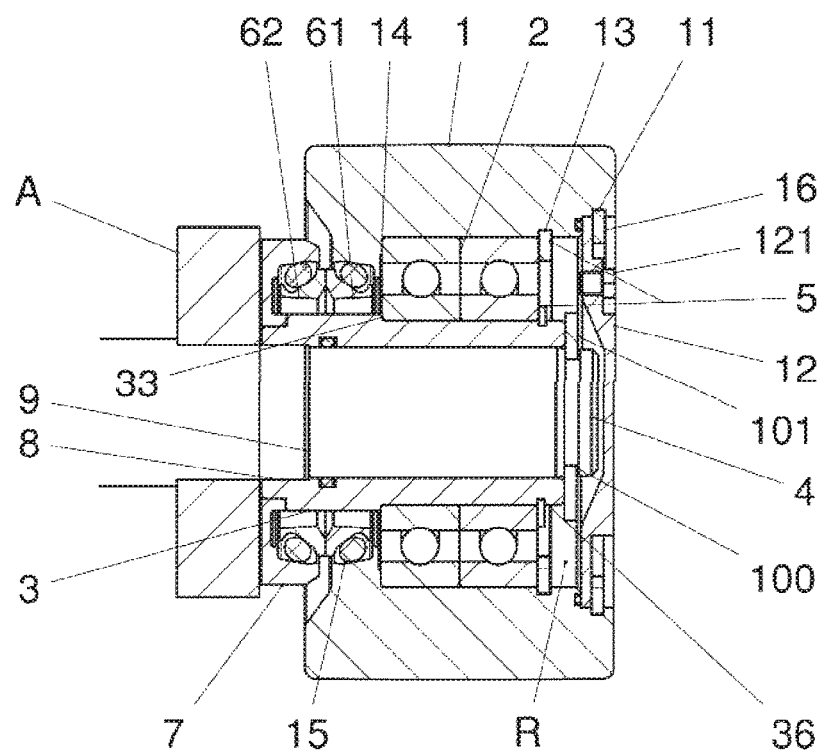
FIG. 8 shows a sectional view of a further embodiment of a roller arrangement according to the invention (with outer link plate) with a fastening system, but without a clip fastening system.
Figure 9:
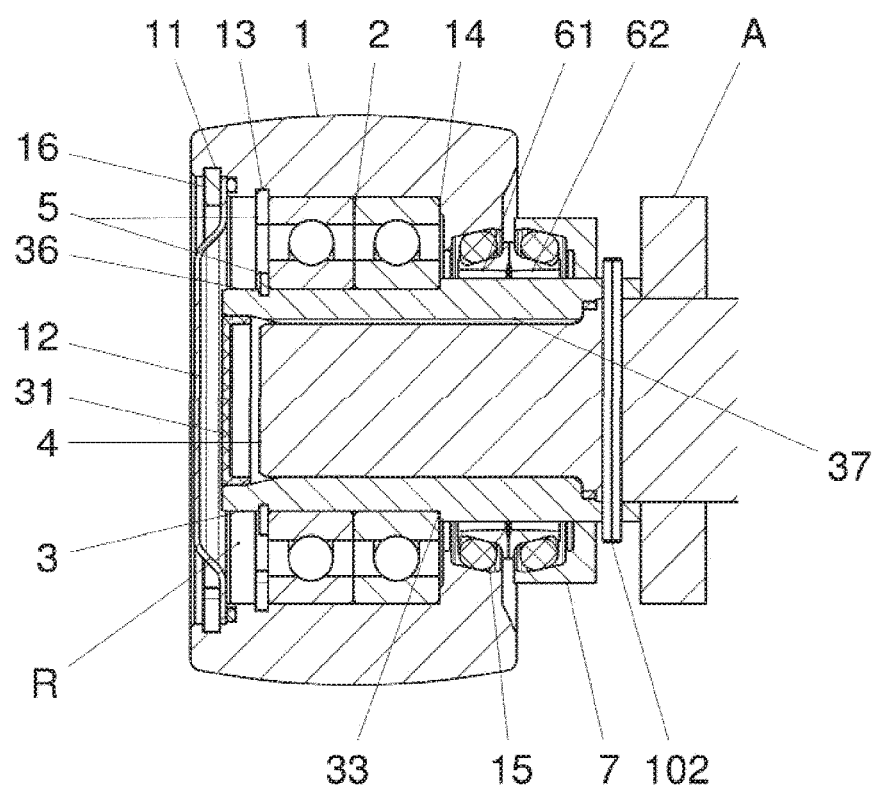
FIG. 9 shows a sectional view of a further embodiment of a roller arrangement according to the invention (with outer link plate) with a fastening system, but without a clip fastening system.

The fastening system is intended to serve for the fastening, preferably releasable fastening, in particular releasable axial fixing, of the roller unit L, in particular of the attachment bush 3, to the attachment bolt 4. An example of such a fastening system is shown in FIGS. 8 and 9. However, an embodiment of the fastening system as a clip fastening system will be discussed first.

The clip fastening system is intended for mounting, and in particular axially fixing, the roller unit L on the attachment bolt 4, preferably without using tools. For this purpose, the attachment bush 3 is preferably provided with a groove 32, preferably a radially encircling groove, at a suitable location in the inner surface, and the outer surface of the attachment bolt is equipped with a corresponding groove 43. A flexible securing ring 10, i.e., a clip, is optionally placed in the groove of the attachment bolt or of the attachment bush. When the roller unit L is pushed onto the attachment bolt 4, the securing ring 10 initially retreats until the grooves 32, 43 are flush, in order then to be received in both grooves 32, 43 and to counteract a pulling-off of the roller unit L. The clip fastening system is preferably configured as a form-fit connector, but other types of connection are also conceivable.

The clip fastening system can additionally be equipped with a release mechanism, which permits the subsequent release of the clip fastening system. For this purpose, for example, the groove 43 in the attachment bolt can be formed by the attachment bolt 4 itself and by a plate 41 screwed by a screw 42, or otherwise releasably mounted, in front of the end face of the attachment bolt. In order to release the clip fastening system again, the roller cover 12 and the attachment bush cover 31 are removed, and the plate 41 is released by unscrewing the screw 42. Correspondingly, the roller unit can be pulled off from the attachment bolt 4. The mounting procedure takes place in the usual way, with the plate 41 first of all being screwed back on again. The roller unit L can be replaced or, for example, can be filled up again with lubricant, and the roller cover 12 and attachment bush cover 31 are once more closed. The roller unit L can be fastened in place again by simply being plugged onto the attachment bolt 4.

A link chain arrangement according to the invention comprises mainly a link chain and a roller device according to the invention.

The structure of a link chain is well known to a person skilled in the art. A link chain, in particular a bush chain, is constructed essentially from two chain elements which are lined up beside each other. These elements are also referred to as an inner link and outer link. An outer link usually comprises two outer link plates A, which are connected to each other by two bolts B. An inner link is usually made up of two inner link plates I, which are connected to each other by two bushes U. Embodiments are also conceivable with only one link plate, which is configured as a bar link plate for example. In each case a bush U and a bolt B inserted into the bush of adjacent chain links form a chain joint. These joints allow the link chain, for example, to wrap around the chain wheels located in the drive train.

In addition to numerous other applications, link chains lend themselves to be used as a conveying chain. For this purpose, the link chain is equipped with at least one roller, here according to the invention with at least one roller configured as a roller unit L, and preferably with an attachment mechanism M for the arrangement of add-on parts, for example platforms.

Examples of possible attachment mechanisms M for add-on parts are angled link plates of L-shaped cross section which are integrated in the link chain instead of or in addition to the conventional link plates. However, other attachment mechanisms for add-on parts are also conceivable.

As has already been described above, a link chain according to the invention configured as a conveying chain is equipped with at least one roller unit L. To mount the respective roller unit L, the link chain is equipped with an assigned attachment bolt 4 which is configured for the plugging on of the roller unit L. The attachment bolt 4 is generally an extended bolt B of the link chain, in which a bolt portion serving as attachment bolt 4 protrudes from the outer link plate A of the link chain. The attachment bolt 4 is generally oriented perpendicularly with respect to the longitudinal direction or running direction of the chain.

A slightly modified version of the roller and roller device is shown in FIG. 8. The roller cover 12 is here equipped with a filling opening 121 for lubricant. Moreover, the embodiment shown here does not have a clip fastening system, nor an attachment bush cover. A securing ring 101 is plugged into a groove 100 of the attachment bolt, which groove 100 is arranged outside the attachment bush 3 in a plugged-on state. This securing ring 101 fixes the attachment bush 3 axially on the attachment bolt 4. In this way, a fastening system as already mentioned above is made available.

A further embodiment of a roller and roller device is shown in FIG. 9. Here, the fastening system for fastening the attachment bush 3 on the attachment bolt 4 is formed substantially by a securing pin 102 which is inserted through aligned bores in attachment bush 3 and attachment bolt 4. The aligned bores are preferably located outside the lubricant-accommodating space R, in particular between housing 7 and link plate A. The bores are preferably oriented transversely with respect to the longitudinal axis of the attachment bush 3 and attachment bolt 4. In this embodiment of the fastening system, it is possible, for example, to dispense with the anti-rotation mechanism 8 and/or abutment mechanism 9.

What is claimed is:

1. A roller device, comprising
   an attachment bolt;
   a roller mounted on the attachment bolt, wherein the roller is configured as a roller unit including at least one attachment bush, a bearing, and a roller; and
   a fastening system for releasably axial fixing the attachment bush of the roller unit to the attachment bolt, wherein the fastening system comprises a clip fastening system to mount the roller unit on the attachment bolt without using tools, the clip fastening system comprising a radially encircling groove in the inner surface of the attachment bush, a radially encircling groove in the surface of the attachment bolt, and a flexible securing ring.

2. The roller device of claim 1, wherein the attachment bush, the bearing, and the roller are connected to one another releasably, and wherein the roller is mounted rotatably about the attachment bush via the bearing.

3. The roller device of claim 1, wherein the bearing is fixed axially and releasably between the roller and the attachment bush, wherein the releasable axial fixing comprises a shoulder in an interior of the roller and a corresponding shoulder on an outer face of the attachment bush, and wherein at least one additional securing ring is inserted into at least one of an additional groove in the roller or an additional groove of the attachment bush.

4. The roller device of claim 1, wherein the roller is equipped with a lubricant-accommodating arrangement.

5. The roller device of claim 4, wherein the lubricant-accommodating arrangement comprises a lubricant-accommodating space.

6. The roller device of claim 4, wherein the lubricant-accommodating arrangement comprises a sealing arrangement comprising at least one slide ring seal.

7. The roller device of claim 4, wherein the lubricant-accommodating arrangement comprises a roller cover connected releasably to the roller and/or an attachment bush cover connected releasably to the attachment bush.

8. The roller device of claim 7, wherein the roller device is equipped with an anti-rotation mechanism between the attachment bush and the attachment bolt, wherein the anti-rotation mechanism comprises a protuberance in the interior of the attachment bush and a corresponding recess in the attachment bolt.

9. The roller device of claim 1, wherein the roller device is equipped with an abutment mechanism to limit the axial displaceability of the attachment bush with respect to the attachment bolt, wherein the abutment mechanism comprises a shoulder on the attachment bolt and a corresponding shoulder on the attachment bush.

10. The roller device of claim 1, wherein the clip fastening system is equipped with a release mechanism, wherein the groove in the attachment bolt is formed by the attachment bolt itself and by a plate fastened releasably by screwing in front of the end face of the attachment bolt.

11. A link chain, wherein the link chain is equipped with the roller device of claim 1.

12. The link chain of claim 11, wherein the link chain comprises at least two chain links, including an inner link and an outer link, wherein the inner link is configured as a bar link plate with two bushes or comprises at least two inner link plates connected to each other by two bushes, wherein the outer link comprises at least two outer link plates connected to each other by two bolts, wherein a bush and a bolt inserted into the bush of adjacent chain links form a chain joint, wherein the attachment bolt is configured as an extension of the bolt protruding from the outer link plate, and wherein the roller unit is plugged onto the attachment bolt.

13. A roller device, comprising
   an attachment bolt;
   a roller unit including at least one attachment bush, a bearing, and a roller; and
   a fastening system configured to releasably axially fix the attachment bush to the attachment bolt without using tools by having a securing ring being received by a first radially encircling groove provided in an inner surface of the attachment bush and by having the securing ring being received by a second radially encircling groove provided in a surface of the attachment bolt,
   wherein the roller is mounted rotatably about the attachment bush via the bearing.

* * * * *